United States Patent
Qiu et al.

(10) Patent No.: US 10,109,198 B2
(45) Date of Patent: Oct. 23, 2018

(54) METHOD AND APPARATUS OF NETWORKED SCENE RENDERING AND AUGMENTATION IN VEHICULAR ENVIRONMENTS IN AUTONOMOUS DRIVING SYSTEMS

(71) Applicants: GM GLOBAL TECHNOLOGY OPERATIONS LLC, Detroit, MI (US); RUTGERS, THE STATE UNIVERSITY OF NEW JERSEY, Piscataway, NJ (US)

(72) Inventors: Hang Qiu, Los Angeles, CA (US); Ramesh Govindan, Cerritos, CA (US); Marco Gruteser, Princeton, NJ (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/453,164

(22) Filed: Mar. 8, 2017

(65) Prior Publication Data

US 2018/0261095 A1 Sep. 13, 2018

(51) Int. Cl.
*G08G 1/16* (2006.01)
*H04W 4/02* (2018.01)
*H04W 24/08* (2009.01)
*H04L 12/26* (2006.01)
*G05D 1/02* (2006.01)

(52) U.S. Cl.
CPC ............ *G08G 1/161* (2013.01); *G08G 1/166* (2013.01); *H04L 43/0864* (2013.01); *H04L 43/0882* (2013.01); *H04W 4/023* (2013.01); *H04W 24/08* (2013.01); *G05D 1/0274* (2013.01); *H04W 4/027* (2013.01)

(58) Field of Classification Search
CPC ....... G08G 1/161; G08G 1/166; H04W 4/023; H04W 4/027; H04W 24/08; H04L 43/0864; H04L 43/0882; G05D 1/027
See application file for complete search history.

(56) References Cited

U.S. PATENT DOCUMENTS

| | | | |
|---|---|---|---|
| 6,601,098 B1* | 7/2003 | Case | H04L 29/12009 370/253 |
| 8,849,494 B1* | 9/2014 | Herbach | B60W 30/00 701/24 |
| 8,989,944 B1* | 3/2015 | Agarwal | G01S 13/87 340/425.5 |
| 9,870,624 B1* | 1/2018 | Narang | G06T 7/521 |
| 2010/0214085 A1* | 8/2010 | Avery | G08G 1/161 340/435 |
| 2016/0358475 A1* | 12/2016 | Prokhorov | G05D 1/0011 |
| 2017/0123419 A1* | 5/2017 | Levinson | G05D 1/0027 |
| 2017/0192423 A1* | 7/2017 | Rust | G05D 1/0038 |
| 2018/0160333 A1* | 6/2018 | Patil | H04W 28/0236 |

* cited by examiner

*Primary Examiner* — Michael J Zanelli

(57) ABSTRACT

A system and method is taught for vehicles controlled by automated driving systems, particularly those configured to automatically control vehicle steering, acceleration, and braking during a drive cycle without human intervention. In particular, the present disclosure teaches a system and method for generation situational awareness and path planning data and transmitting this information via vehicle to vehicle communications where one vehicle has an obstructed view to objects not within an obstructed view of a second vehicle.

8 Claims, 5 Drawing Sheets

METHOD AND APPARATUS OF NETWORKED SCENE RENDERING AND AUGMENTATION IN VEHICULAR ENVIRONMENTS IN AUTONOMOUS DRIVING SYSTEMS

TECHNICAL FIELD

The present disclosure relates to vehicles controlled by automated driving systems, or ADAS-assisted human driving. In the former case, the vehicle is configured to automatically control vehicle steering, acceleration, and braking during a drive cycle without human intervention. In particular, the present disclosure teaches a system and method for generation situational awareness and path planning data and transmitting this information via vehicle to vehicle communications.

INTRODUCTION

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Appropriate situation awareness is essential for autonomous driving due to safety concerns. Even though it is desirable to put all available information into autonomous driving decision process; however, for practical implementation, input data to the system should be limited and manageable; therefore it needs to be well-designed for both efficiency and sufficiency for decision making. An autonomous vehicle generally must generate a data structure to perceive situations around the vehicle. However some areas are blocked from being perceived by the vehicle sensors and therefore cannot be accurately implemented in localization and mapping. It would be desirable to overcome these limitations in order to generate improved situational awareness and path planning.

SUMMARY

Embodiments according to the present disclosure provide a number of advantages. For example, embodiments according to the present disclosure may enable independent validation of autonomous vehicle control commands to aid in diagnosis of software or hardware conditions in the primary control system. Embodiments according to the present disclosure may thus be more robust, increasing customer satisfaction.

The present disclosure describes a method comprising determining a data related to a location of a first object, determining a bandwidth and a latency of a transmission channel, and transmitting a portion of the data in response to the bandwidth and latency of the transmission channel Another aspect of the present disclosure describes an apparatus comprising a sensor for receiving data related to a location of a first object proximate to the apparatus, a processor for determining a bandwidth and a latency of a transmission channel and for determining a portion of the data in response to the bandwidth and latency of the transmission channel, and a transmitter for transmitting the portion of the data.

The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
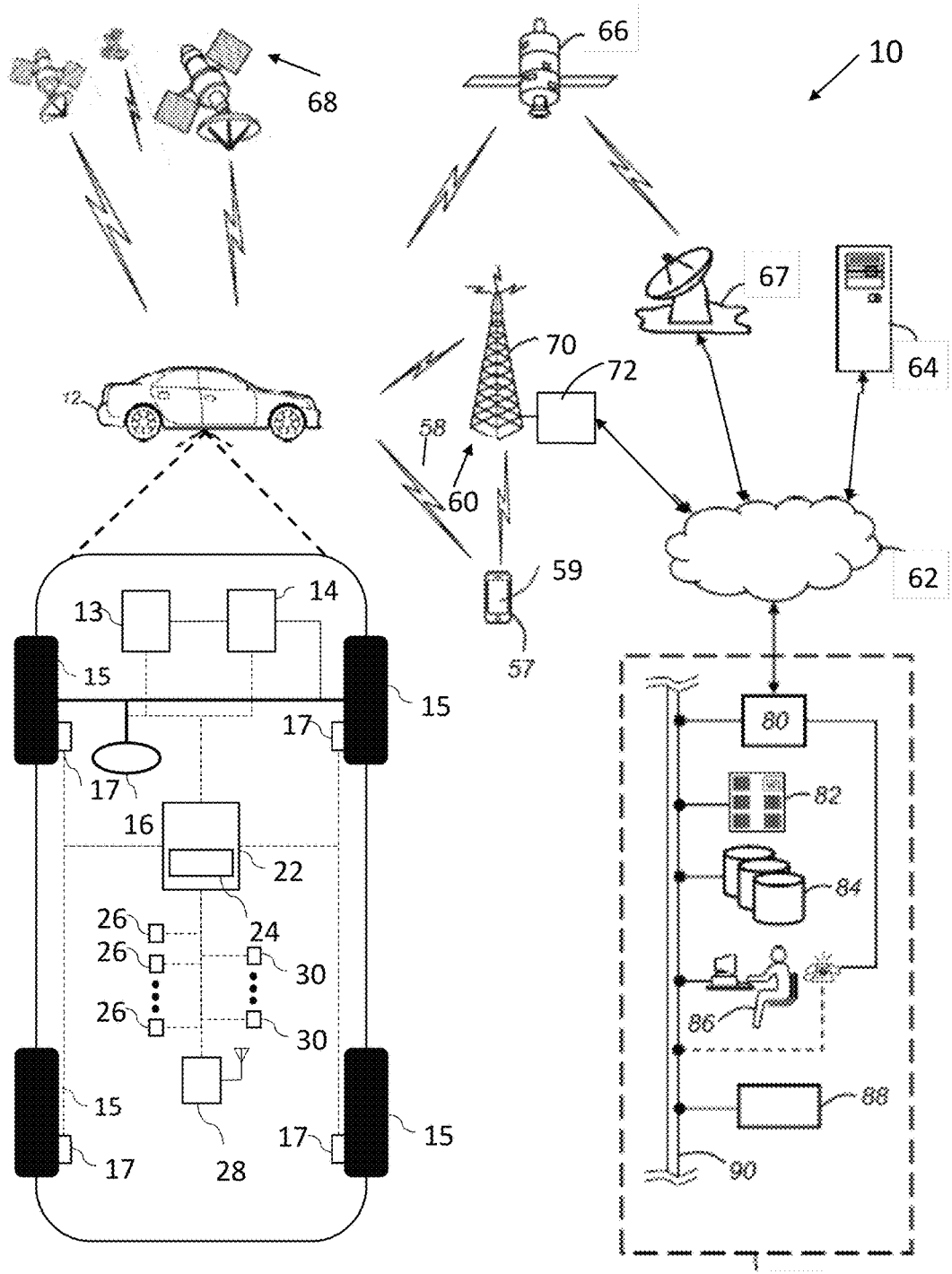
FIG. 1 is a schematic diagram of a communication system including an autonomously controlled vehicle, according to an embodiment.

FIG. 1 schematically illustrates an operating environment that comprises a mobile vehicle communication and control system 10 for a motor vehicle 12. The communication and control system 10 for the vehicle 12 generally includes one or more wireless carrier systems 60, a land communications network 62, a computer 64, a networked wireless device 57 including but not limited to a smart phone, tablet, or wearable device such as a watch, and a remote access center 78.

The vehicle 12, shown schematically in FIG. 1, includes a propulsion system 13, which may in various embodiments include an internal combustion engine, an electric machine such as a traction motor, and/or a fuel cell propulsion system. Vehicle 12 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used.

The vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes a steering system 16. While depicted as including a steering wheel for illustrative purposes, in some embodiments contemplated within the scope of the present disclosure, the steering system 16 may not include a steering wheel.

The vehicle 12 includes a wireless communications system 28 configured to wirelessly communicate with other vehicles ("V2V") and/or infrastructure ("V2I"). In an exemplary embodiment, the wireless communication system 28 is configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor such as a central processing unit (CPU) or graphics processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors or virtual sensors 26, which may include GPS, RADAR, LIDAR, optical cameras, thermal cameras, ultrasonic sensors, wireless ranging device, High-Definition map, and/or additional sensors as appropriate.

FIG. 1 illustrates several networked devices that can communicate with the wireless communication system 28 of the vehicle 12. One of the networked devices that can communicate with the vehicle 12 via the wireless communication system 28 is the networked wireless device 57. The networked wireless device 57 can include computer processing capability, a transceiver capable of communicating using a short-range wireless protocol, and a visual display 59. The computer processing capability includes a microprocessor in the form of a programmable device that includes one or more instructions stored in an internal memory structure and applied to receive binary input to create binary output. In some embodiments, the networked wireless device 57 includes a GPS module capable of receiving GPS satellite signals and generating GPS coordinates based on those signals. In other embodiments, the networked wireless device 57 includes cellular communications functionality such that the networked wireless device 57 carries out voice and/or data communications over the wireless carrier system 60 using one or more cellular communications protocols, as are discussed herein. The visual display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the vehicle 12. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers. Bi-directional communication can include, for example, satellite telephony services using the satellite 66 to relay telephone communications between the vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), wireless mesh network or mobile ad hoc network, or networks providing broadband wireless access (BWA), or DSRC-based vehicular networks, or any combination thereof. Furthermore, the remote access center 78 need not be connected via land network 62, but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the vehicle 12, the remote access center 78, the networked wireless device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12.

The remote access center 78 is designed to provide the wireless communications system 28 of the vehicle 12 with a number of different system functions and, according to the exemplary embodiment shown in FIG. 1, generally includes one or more switches 80, servers 82, databases 84, live advisors 86, as well as an automated voice response system (VRS) 88. These various remote access center components are preferably coupled to one another via a wired or wireless local area network 90. The switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and the network 90. Data transmissions are passed via the modem to the server 82 and/or the database 84. The database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned remote access center 78 using the live advisor 86, it will be appreciated that the remote access center can instead utilize the VRS 88 as an automated advisor, or a combination of the VRS 88 and the live advisor 86 can be used.

Figure 2:
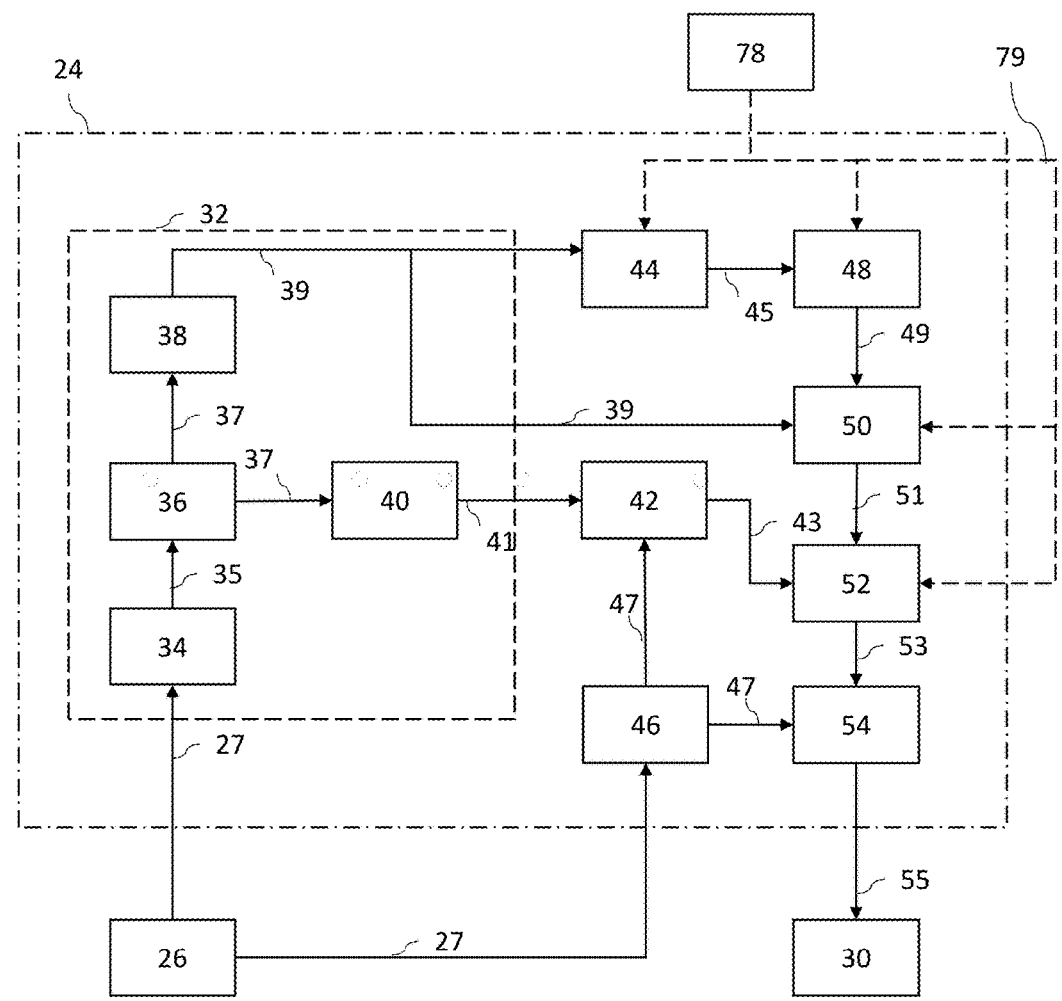
FIG. 2 is a schematic block diagram of an automated driving system (ADS) for a vehicle, according to an embodiment.

As shown in FIG. 2, the ADS 24 includes multiple distinct control systems, including at least a perception system 32 for determining the presence, location, classification, and path of detected features or objects in the vicinity of the vehicle. The perception system 32 is configured to receive inputs from a variety of sensors, such as the sensors 26 illustrated in FIG. 1, and synthesize and process the sensor inputs to generate parameters used as inputs for other control algorithms of the ADS 24.

The perception system 32 includes a sensor fusion and preprocessing module 34 that processes and synthesizes sensor data 27 from the variety of sensors 26. The sensor fusion and preprocessing module 34 performs calibration of the sensor data 27, including, but not limited to, LIDAR to LIDAR calibration, camera to LIDAR calibration, LIDAR to chassis calibration, and LIDAR beam intensity calibration. The sensor fusion and preprocessing module 34 outputs preprocessed sensor output 35.

A classification and segmentation module 36 receives the preprocessed sensor output 35 and performs object classification, image classification, traffic light classification, object segmentation, ground segmentation, and object tracking processes. Object classification includes, but is not limited to, identifying and classifying objects in the surrounding environment including identification and classification of traffic signals and signs, RADAR fusion and tracking to account for the sensor's placement and field of view (FOV), and false positive rejection via LIDAR fusion to eliminate the many false positives that exist in an urban environment, such as, for example, manhole covers, bridges, overhead trees or light poles, and other obstacles with a high RADAR cross section but which do not affect the ability of the vehicle to travel along its path. Additional object classification and tracking processes performed by the classification and segmentation model 36 include, but are not limited to, freespace detection and high level tracking that fuses data from RADAR tracks, LIDAR segmentation, LIDAR classification, image classification, object shape fit models, semantic information, motion prediction, raster maps, static obstacle maps, and other sources to produce high quality object tracks.

The classification and segmentation module 36 additionally performs traffic control device classification and traffic control device fusion with lane association and traffic control device behavior models. The classification and segmentation module 36 generates an object classification and segmentation output 37 that includes object identification information. The classification and segment module 36 could also track the dynamic objects via processing the temporal displacement between consecutive frames.

A localization and mapping module 40 uses the object classification and segmentation output 37 to calculate parameters including, but not limited to, estimates of the position and orientation of vehicle 12 in both typical and challenging driving scenarios. These challenging driving scenarios include, but are not limited to, dynamic environments with many cars (e.g., dense traffic), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle), and severe weather (such as snow, rain, fog, slate, darkness, sun glare).

The localization and mapping module 40 also incorporates new data collected as a result of expanded map areas obtained via onboard mapping functions performed by the vehicle 12 during operation and mapping data "pushed" to the vehicle 12 via the wireless communication system 28. The localization and mapping module 40 updates previous map data with the new information (e.g., new lane markings, new building structures, addition or removal of constructions zones, etc.) while leaving unaffected map regions unmodified. Examples of map data that may be generated or updated include, but are not limited to, yield line categorization, lane boundary generation, lane connection, classification of minor and major roads, classification of left and right turns, and intersection lane creation.

In some embodiments, the localization and mapping module 40 uses SLAM techniques to develop maps of the surrounding environment. SLAM is an acronym for Simultaneous Localization and Mapping. SLAM techniques construct a map of an environment and track an object's position within the environment at the same time. GraphSLAM, a variant of SLAM, employs sparse matrices which are used to produce a graph containing observation interdependencies, by leveraging scholastic graph theory mechanism SLAM (or GraphSLAM) could be generated using a variety of advanced perception sensors such as 2D/3D Lidar, Radar, mono camera, or stereo camera system.

Object position within a map is represented by a Gaussian probability distribution centered around the object's predicted path. SLAM in its simplest form utilizes three constraints: an initial location constraint; a relative motion constraint, which is the object's path; and a relative measurement constraint, which is one or more measurements of an object to a landmark.

The initial motion constraint is the initial pose (e.g., position and orientation) of the vehicle, which consists of the vehicle's position in two or three dimensional space including pitch, roll, and yaw data. The relative motion constraint is the displaced motion of the object which contains a degree of flexibility to accommodate map consistency. The relative measurement constraint includes one or more measurements from the object sensors to a landmark. The initial location constraint, the relative motion constraint, and the relative measurement constraint are typically Gaussian probability distributions. Object locating methods within a sensor-generated map typically employ Kalman filters, various statistical correlation methods such as the Pearson product-moment correlation, and/or particle filters. Efficient Kalman Filter (EKF) or other more efficient alternative solution such as Rao-Blackwellized Filter (RBF) could be engaged to solve this SLAM problem.

In some embodiments, once a map is built, vehicle localization is achieved in real time via a particle filter. Particle filters, unlike Bayes or Kalman filters, accommodate non-linear systems. To locate a vehicle, particles are generated around an expected mean value via a Gaussian probability distribution. Each particle is assigned a numerical weight representing the accuracy of the particle position to the predicted position. Sensor data is taken into account and the particle weights are adjusted to accommodate the sensor data. The closer the proximity of the particle to the sensor adjusted position, the greater the numerical value of the particle weights.

As an action command occurs, each particle is updated to a new predicted position. Sensor data is observed at the new predicted position and each particle is assigned a new weight representing the accuracy of the particle position with respect to the predicted position and sensor data. The particles are re-sampled, selecting the weights that have the most numerical magnitude, thus increasing the accuracy of the predicted and sensor-corrected object position. Typically the mean, variance, and standard deviation of the resampled data provides the new object position likelihood.

Particle filter processing is expressed as:

$$P(H_t|H_{t-1},A_t,D_t) \quad \text{Equation 1}$$

where $H_t$ is the current hypothesis, which is the object position. $H_{t-1}$ is the previous object position, $A_t$ is the action, which is typically a motor command, and $D_t$ is the observable data.

In some embodiments, the localization and mapping module 40 maintains an estimate of the vehicle's global position by incorporating data from multiple sources as discussed above in an Extended Kalman Filter (EKF) framework. Kalman filters are linear filters based on Recursive Bayesian Filters. Recursive Bayesian Filters, also referred to as Recursive Bayesian Estimation, essentially substitute the posterior of an estimation into the prior position to calculate a new posterior on a new estimation iteration. This effectively yields:

$$P(H_t|H_{t-1},D_t) \quad \text{Equation 2}$$

where the probability of a hypothesis $H_t$ is estimated by the hypothesis at the previous iteration $H_{t-1}$ and the data $D_t$ at current time t.

A Kalman filter adds an action variable $A_t$ where t is a time iteration, yielding:

$$P(H_t|H_{t-1},A_t,D_t) \quad \text{Equation 3}$$

where the probability of a hypothesis $H_t$ is based on the previous hypothesis $H_{t-1}$, an action $A_t$, and data $D_t$ at current time t.

Used extensively in robotics, a Kalman filter estimates a current position, which is a joint probability distribution, and based on an action command predicts a new position which is also a joint probability distribution, called a state prediction. Sensor data is acquired and a separated joint probability distribution is calculated, called a sensor prediction.

State prediction is expressed as:

$$X'_t = AX_{t-1} + B\mu + \xi_t \quad \text{Equation 4}$$

where $X'_t$ is a new state based on the previous state $AX_{t-1}$, $B\mu$, and $\xi_t$. Constants A and B are defined by the physics of interest, $\mu$ is typically a robotic motor command, and $\xi_t$ is a Gaussian state error prediction.

Sensor prediction is expressed as:

$$Z'_t = CX_t + \xi_z \quad \text{Equation 5}$$

where $Z'_t$ is the new sensor estimate, C is a function and $\xi_z$ is a Gaussian sensor error prediction.

A new predicted state estimate is expressed as:

$$X_{EST} = X'_t + K(Z_t - Z'_t) \quad \text{Equation 6}$$

where the product $K(Z_t - Z'_t)$ is referred to as the Kalman gain factor. If the difference between the sensor prediction $Z'_t$ and the actual sensor data $Z_t$ (that is, $Z_t - Z'_t$) is reasonably close to zero, then $X'_t$ is considered to be the new state estimate. If $Z_t - Z'_t$ is reasonably larger than zero, the $K(Z_t - Z'_t)$ factor is added to yield a new state estimate.

As vehicle movement information is received, the EKF updates the vehicle position estimate while also expanding the estimate covariance. Once the sensor covariance is integrated into the EKF, the localization and mapping module 40 generates a localization and mapping output 41 that includes the position and orientation of the vehicle 12 with respect to detected obstacles and road features.

A vehicle odometry module 46 receives data 27 from the vehicle sensors 26 and generates a vehicle odometry output 47 which includes, for example, vehicle heading, velocity, and distance information. An absolute positioning module 42 receives the localization and mapping output 41 and the vehicle odometry information 47 and generates a vehicle location output 43 that is used in separate calculations as discussed below.

An object prediction module 38 uses the object classification and segmentation output 37 to generate parameters including, but not limited to, a location of a detected obstacle relative to the vehicle, a predicted path of the detected obstacle relative to the vehicle, and a location and orientation of traffic lanes relative to the vehicle. Bayesian models may be used in some embodiments to predict driver or pedestrian intent based on semantic information, previous trajectory, and instantaneous pose, where pose is the combination of the position and orientation of an object.

Commonly used in robotics, Bayes' Theorem, also referred to as a Bayesian filter, is a form of conditional probability. Bayes' Theorem, shown below in Equation 7, sets forth the proposition that the probability of a hypothesis H, given data D, is equal to the probability of a hypothesis H times the likelihood of the data D given the hypothesis H, divided by the probability of the data P(D).

$$P(H|D) = \frac{P(H)\,P(D|H)}{P(D)} \qquad \text{Equation 7}$$

P(H/D) is referred to as the posterior and P(H) is referred to as the prior. Bayes' Theorem measures a probabilistic degree of belief in a proposition before (the prior) and after (the posterior) accounting for evidence embodied in the data, D. Bayes' Theorem is commonly used recursively when iterated. On each new iteration, the previous posterior becomes the prior to produce a new posterior until the iteration is complete. Data on the predicted path of objects (including pedestrians, surrounding vehicles, and other moving objects) is output as an object prediction output 39 and is used in separate calculations as discussed below.

The ADS 24 also includes an observation module 44 and an interpretation module 48. The observation module 44 generates an observation output 45 received by the interpretation module 48. The observation module 44 and the interpretation module 48 allow access by the remote access center 78. A live expert or advisor, e.g. the advisor 86 illustrated in FIG. 1, can optionally review the object prediction output 39 and provide additional input and/or override automatic driving operations and assume operation of the vehicle if desired or required by a vehicle situation. The interpretation module 48 generates an interpreted output 49 that includes additional input provided by the live expert, if any. The interpretation module may include a cognitive processor including a working Memory and an episodic memory. The cognitive processor is operative to provide efficient situation awareness, and a system for storing and recalling situation awareness from previous experiences.

A path planning module 50 processes and synthesizes the object prediction output 39, the interpreted output 49, and additional routing information 79 received from an online database or live expert of the remote access center 78 to determine a vehicle path to be followed to maintain the vehicle on the desired route while obeying traffic laws and avoiding any detected obstacles. The path planning module 50 employs algorithms configured to avoid any detected obstacles in the vicinity of the vehicle, maintain the vehicle in a current traffic lane, and maintain the vehicle on the desired route. The path planning module 50 uses pose-graph optimization techniques, including non-linear least square pose-graph optimization, to optimize the map of car vehicle trajectories in six degrees of freedom and reduce path errors. The path planning module 50 outputs the vehicle path information as path planning output 51. The path planning output 51 includes a commanded vehicle path based on the vehicle route, vehicle location relative to the route, location and orientation of traffic lanes, and the presence and path of any detected obstacles.

A first control module 52 processes and synthesizes the path planning output 51 and the vehicle location output 43 to generate a first control output 53. The first control module 52 also incorporates the routing information 79 provided by the remote access center 78 in the case of a remote take-over mode of operation of the vehicle.

A vehicle control module 54 receives the first control output 53 as well as velocity and heading information 47 received from vehicle odometry 46 and generates vehicle control output 55. The vehicle control output 55 includes a set of actuator commands to achieve the commanded path from the vehicle control module 54, including, but not limited to, a steering command, a shift command, a throttle command, and a brake command.

The vehicle control output 55 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

It should be understood that the disclosed methods can be used with any number of different systems and is not specifically limited to the operating environment shown here. The architecture, construction, setup, and operation of the system 10 and its individual components is generally known. Other systems not shown here could employ the disclosed methods as well.

Figure 3:
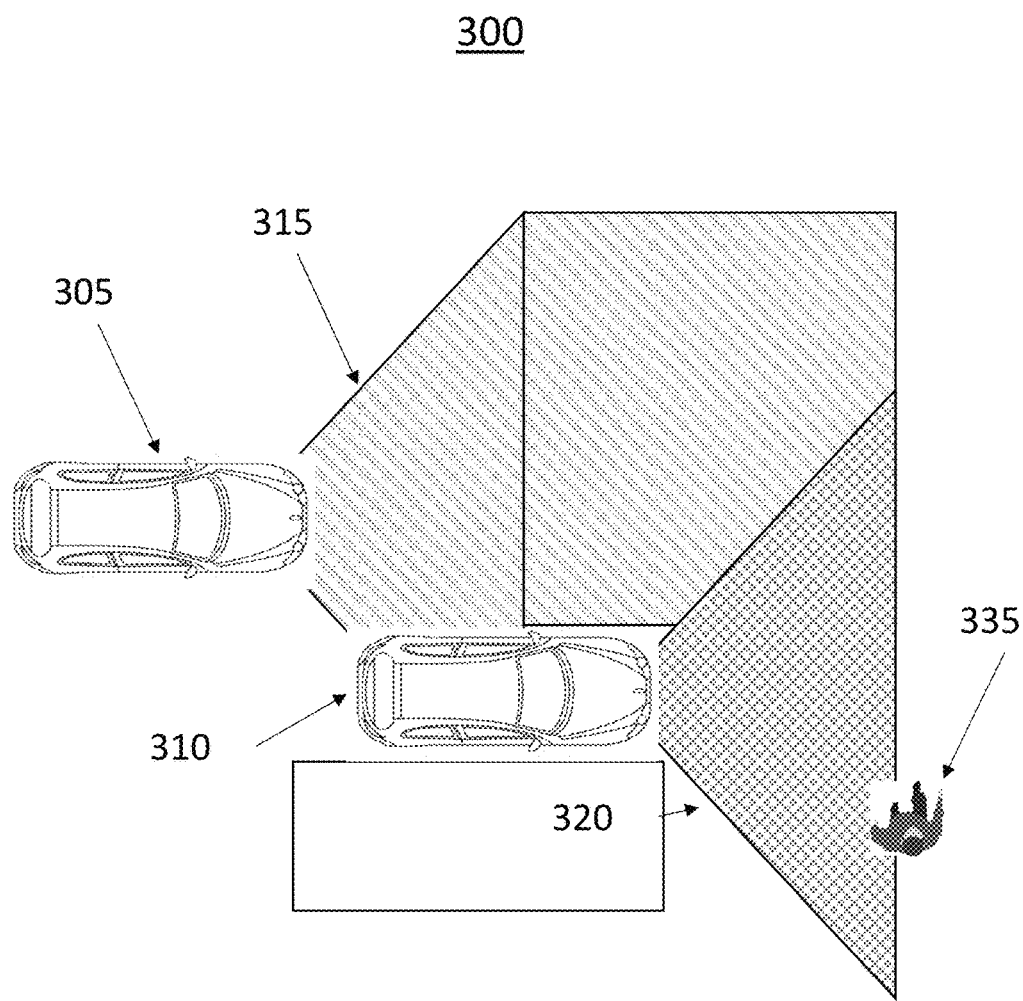
FIG. 3 is a visual representation of an exemplary situational operation according to an embodiment.

Turning now to FIG. 3 a visual representation 300 of an exemplary situational operation according to an embodiment is shown. In an exemplary embodiment where a first vehicle 305 is equipped with various sensors and may be operational for simultaneous localization and mapping (SLAM) to construct a map of the surrounding environment, there may be instances where there are gaps in the coverage of the sensed environment. For example, for the first vehicle 305, a first region of coverage 315 is shown. A portion of the first region of coverage is blocked by the second vehicle 310, therefore preventing the detection of the pedestrian 335 by the first vehicle 305. In this exemplary embodiment, the second vehicle 310 is also equipped with a sensor suite capable of detecting objects within at least the second region of coverage 320. Thus, the second vehicle 310 would be able to detect the pedestrian 335. It would be desirable for the second vehicle 310 to be able to relay information to the first vehicle 305 in order for the first vehicle to have a complete determination of the first region of coverage 315 augmented by information from the second vehicle 310 in order to generate a complete 3D model of the surrounding environment. Optical sensors covering the first region of coverage 315 and the second region of coverage 320 may be one-dimensional (single beam) or 2D- (sweeping) laser rangefinders, 3D High Definition LiDAR, 3D Flash LIDAR, 2D or 3D sonar sensors and one or more 2D/3D Mono or stereo cameras which may be used to generate a 2D or 3D view of the surrounding environment.

The exemplary system is operative to provide an extended 3D vision to vehicles via perspective sharing and transformation through vehicle to everything (V2X) communication, especially during challenging occlusion/weather conditions. The system advantageously extends and augments the 3D vision beyond line-of-sight perception range via V2X communication and provides efficient object rendering solution using a suites of adaptive information retrieval protocols based on available V2X bandwidth and latency requirements. The exemplary system is further robust to frame/packet drops through visual odometer dead-reckoning mechanisms and requires fewer system state estimation parameters.

Figure 4:
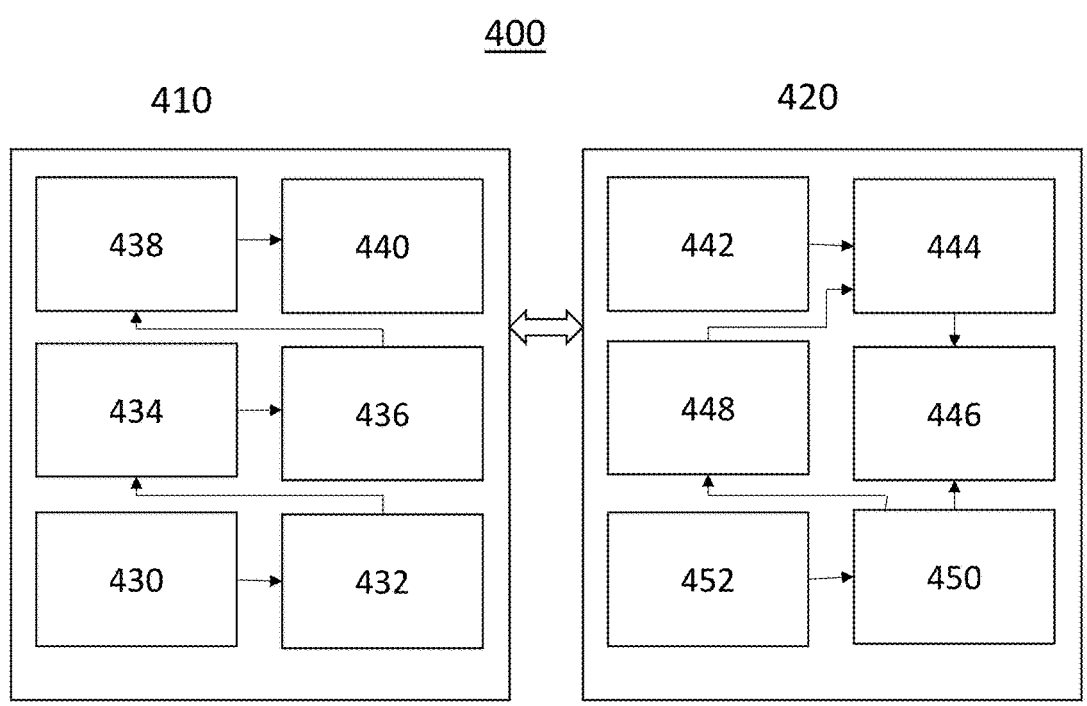
FIG. 4, is a systematic block diagram of a system software architecture according to an embodiment.

Turning now to FIG. 4, a systematic block diagram of a system software architecture 400 according to an embodiment is shown. The exemplary system is a collaborative vehicle sensing system, that is operative to provide extended 3D vision to vehicles via perspective sharing and transformation through vehicle-to-vehicle and vehicle-to-everything (V2V/V2X) communication. The method is operative to augment existing 3D sensing ability by sharing different perspectives to avoid line-of-sight obstruction in order to provide extended vision for better surrounding awareness and path planning of future vehicles.

The exemplary system software is shown to be implemented in two individual systems, where in this exemplary embodiment are resident in a first vehicle system 410 and a second vehicle system 420. The first vehicle system 410 is operative to first receive 2D or 3D sensing data 430 from systems such as radar, lidar or optical cameras. The system then uses this sensing data to generate a point cloud, or a 2D or 3D model 432 of the surrounding environment.

The system may establish a suite of explicit 3D models for the intended objects to be captured, where each model is equipped with appropriate sets of parameters. The parameters of each model is extracted from point cloud generated by each frame, and recorded as key parameter set of the frame. To match the 3D points from frame to frame, rather than directly comparing 3D point cloud or their feature set, the parameter sets S_A and S_B may be extracted from two different frames and A and B are compared for final 3D match.

The system may perform a dead reckoning wherein the augmented vehicle reality (AVR) calculates the motion vector of each dynamic object by averaging over the 3D displacement of all the points belonging to the object. The augmented vehicle reality smooths the motion vector over a short period of time to get the estimated velocity of each moving object. The augmented vehicle reality is then operative to transmit one initial 3D point cloud model of the moving objects, followed by the instantaneous motion vector and velocity. In the instance of a lost or delayed transmission during V2V/V2X communication, the receiver may exercise dead-reckon mechanism based on the velocity of the objects and interpolate between two valid frames.

Once the model of the surrounding area is generated, the model is used by a simultaneous localization and mapping (SLAM) algorithm to construct a map of the surrounding environment while simultaneously keeping track of the vehicle and other stationary and dynamic object within the environment. The SLAM algorithm may employ a particle filter or extended Kalman filter.

The system then extracts the dynamic objects from the mapped environment 436. Dynamic objects may be determined by their change in position in the map, change in relative position within one or more sensor region of coverage, or change in position with respect to the vehicle. In one exemplary method, the system is operative to identify dynamic objects from the surrounding environment in order to transmit information related to these objects to other devices. This reduces the amount of data to be sent, rather than transmitting data related to stationary objects or other environmental objects. To further compress the data volume of transmission, the system may computes and transmit only the delta, the difference of moving objects in the consecutive observations.

The system may be further operative to leverage the point cloud construction to extract dynamic objects by isolating the dynamic points from the stationary ones. The system matches and tracks 3D points frame by frame to calculate the displacement of each object and thresholding to determine the dynamic objects. To match the 3D points from frame to frame the system may take a fast, lightweight, and real-time alternative by matching 2D pixels (SURF features) to infer the corresponding 3D match.

The system is then operative to perform a bandwidth optimization 438 and to transmit the data 440 via a wireless transmission system. In an exemplary embodiment, vehicle surroundings can be transferred in different representations with various granularities. For example, following representations may be transmitted: Labels, Descriptors, Object points, Point cloud of Dynamic Objects, Full Point Cloud. In a V2V scenario, the adaptive transmission model may determine an alternative best fit format of representations to transmit, according to both the bandwidth and latency budget.

The second vehicle system 420 is then operative to receive the augmented vehicle reality data 442 transmitted by the first vehicle system 410. The system then performs a perspective transformation 444 with respect to the location of the second vehicle. The second system is further operative to first receive 2D or 3D sensing data 452 from systems such as radar, lidar or optical cameras. The second system then uses this sensing data to generate a point cloud, or a 2D or 3D model 450 of the surrounding environment. The second system the combines the data from the point cloud and the perspective transformation do generate a 3D rendering with an extended view including data obscured from the sensors of the second vehicle, but determined and transmitted by the first vehicle. The second vehicle system 420 may be further operative to use a SLAM algorithm to augment the perspective transformation 444 with data generated by the point cloud computation 450.

Figure 5:
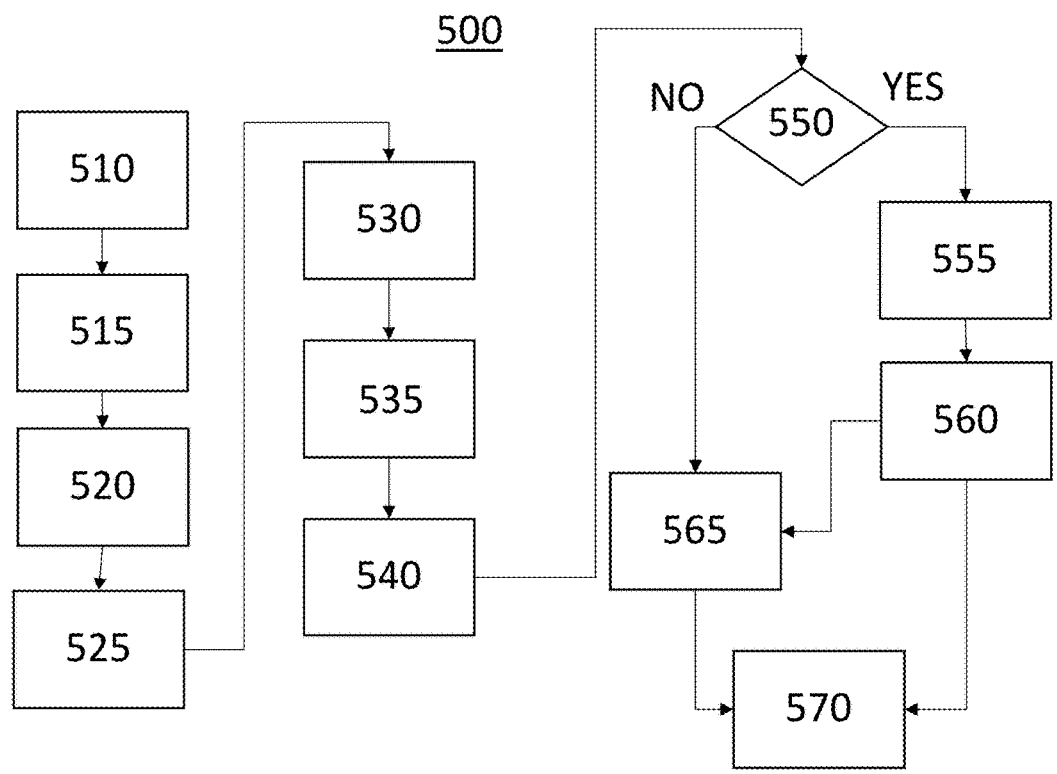
FIG. 5 flow chart representative of an exemplary pseudo algorithm according to an embodiment.

FIG. 5 flow chart representative of an exemplary pseudo algorithm 500 according to an embodiment. The method 500 is first operative to initialize the augmented vehicle reality session 510. The method then performs an evaluation of the effective bandwidth 515 between the transmitter and receiver. The method then determines a communication duration 520. The method then performs a pyramid parameter selection 525. The pyramid parameter selection 525 determines the best fit format of data to transmit in response to the bandwidth and latency budget. This format of data may range from labels only, to labels and descriptors, and may further include object points, and dynamic points. If bandwidth and latency permit, the full point cloud may be transmitted.

When calculating the best fit, the system may determine, for example, that if the available link throughput is C, and the latency requirement is t, the augmented vehicle reality may choose the format with the maximum granularity and the data size less than C*t. The link capacity may vary with the vehicle's relative distance and speed for V2X communication such as DSRC or WiFi but keeps rather relatively stationary for LTE. For the latency budget, the loosest requirement may be the timeliness of the object, which will no longer be valid it it's past the receiver's view. A comparably lightweight includes point clouds belonging to the objects detected by convolutional neural network based detector such as YOLO. A more lightweight representation is the voxels belonging to dynamic objects. The most fine-grained form is the full point cloud where the car can share everything it sees with other cars.

The pseudo algorithm then initiates a handshake protocol between the sender and the receiver 530. The receiver then agrees to the pyramid parameter selection 535. The augmented vehicle reality data packet is then transmitted 540 from the transmitter to the receiver. The receiver then determines if an augmented vehicle reality packet was lost 550. If the packet was not lost, the receiver performs a visual dead reckoning reconciliation 565. The augmented vehicle reality session is then completed 570. If the augmented vehicle reality packet is lost, the receiver performs a visual parameter modeling and extraction 555. The receiving system then performs a visual dead reckoning process 560. The results of the visual dead reckoning process are then used in the visual dead reckoning reconciliation 565. The augmented vehicle reality session is then completed 570.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method comprising:
  receiving a data related to a field of view of a sensor on a first vehicle;
  generating a first point cloud having a first granularity in response to the data;
  determining a bandwidth and a latency of a transmission channel;
  generating a second point cloud having a second granularity in response to the first point cloud and the bandwidth and latency of the transmission channel; and
  transmitting the second point cloud to a second vehicle for use by an autonomous control system.

2. The method of claim 1 further comprising determining a location of a first object within the field of view.

3. The method of claim 2 further comprising determining a velocity of the first object.

4. The method of claim 1 wherein the first granularity is higher than the second granularity.

5. An apparatus comprising:
  a sensor for receiving data related to a field of view of the sensor on a first vehicle;
  a processor for generating a first point cloud having a first granularity in response to the data, determining a bandwidth and a latency of a transmission channel, for generating a second point cloud having a second granularity in response to the first point cloud and the bandwidth and latency of the transmission channel; and
  a transmitter for transmitting the second point cloud to a second vehicle for use by an autonomous control system.

6. The apparatus of claim 5 wherein the processor is further operative to determine a location of a first object within the field of view.

7. The apparatus of claim 6 wherein the processor is further operative to determine a velocity of the first object.

8. The apparatus of claim 5 wherein the first granularity is higher than the second granularity.

* * * * *

UNITED STATES PATENT AND TRADEMARK OFFICE
CERTIFICATE OF CORRECTION

| | | |
|---|---|---|
| PATENT NO. | : 10,109,198 B2 | Page 1 of 1 |
| APPLICATION NO. | : 15/453164 | |
| DATED | : October 23, 2018 | |
| INVENTOR(S) | : Qiu et al. | |

It is certified that error appears in the above-identified patent and that said Letters Patent is hereby corrected as shown below:

In the Specification

Column 1, Line 7: before "TECHNICAL FIELD" insert:
--GOVERNMENT CLAUSE
This invention was made with government support under 1329939 awarded by the National Science Foundation. The Government has certain rights in this invention.--

Signed and Sealed this
Fifteenth Day of October, 2024

Katherine Kelly Vidal
*Director of the United States Patent and Trademark Office*